United States Patent [19]

Hubbard

[11] Patent Number: 4,800,848
[45] Date of Patent: Jan. 31, 1989

[54] WATER INJECTION APPARATUS FOR INTERNAL COMBUSTION ENGINES

[76] Inventor: Von J. Hubbard, 3536 Churchwood Dr., Salt Lake City, Utah 84118

[21] Appl. No.: 50,779

[22] Filed: May 18, 1987

Related U.S. Application Data

[63] Continuation-in-part of Ser. No. 829,186, Feb. 14, 1986, abandoned.

[51] Int. Cl.⁴ .............................................. F02M 25/02
[52] U.S. Cl. .................. 123/25 E; 123/1 A; 123/25 A; 123/25 K; 123/25 L; 123/198 A; 48/189.4
[58] Field of Search ............... 123/25 E, 25 L, 25 A, 123/25 K, 1 A, 198 A; 48/189.4, 189.3

[56] References Cited

U.S. PATENT DOCUMENTS

| | | | |
|---|---|---|---|
| 1,436,690 | 11/1922 | Secor | 48/189.4 |
| 1,696,929 | 1/1929 | Stokes | 123/180 T |
| 2,342,519 | 2/1944 | Pierce | 123/25 K |
| 2,554,612 | 5/1951 | Bills et al. | 123/25 J |
| 3,408,054 | 10/1968 | Walker | 123/339 |
| 3,537,434 | 11/1970 | Herpin | 123/25 E |
| 3,749,376 | 7/1973 | Alm et al. | 123/25 E |
| 3,783,849 | 1/1974 | Bramfitt | 123/576 |
| 4,031,864 | 6/1977 | Crothers | 123/1 A |
| 4,046,119 | 9/1977 | Perry | 123/25 E |
| 4,329,945 | 5/1982 | Beech et al. | 123/25 L |
| 4,336,773 | 6/1982 | Carouthers | 123/25 L |
| 4,391,229 | 7/1983 | Turner | 123/25 L |
| 4,391,230 | 7/1983 | Pierce et al. | 123/25 E |
| 4,417,548 | 11/1983 | Lindberg | 123/25 E |
| 4,448,170 | 5/1984 | O'Hara | 123/25 L |
| 4,589,376 | 5/1986 | Albertson | 123/25 E |

*Primary Examiner*—Andrew M. Dolinar

[57] ABSTRACT

A fluid injection system for injecting atomized fluids into the intake manifold of an internal combustion engine comprising: a fluid reservoir to hold a supply of fluid, means to transport the fluid to a mixer having (i) a mixing junction, (ii) a flow adjustable fluid intake port to receive the fluid and deliver it to the mixing junction, and (iii) a restricted fixed air flow intake port to deliver a predetermined approximately constant air flow into the mixing junction for atomization of the fluids, and collector means and transport the atomized fluid mixture into the intake manifold.

11 Claims, 2 Drawing Sheets

WATER INJECTION APPARATUS FOR INTERNAL COMBUSTION ENGINES

BACKGROUND OF THE INVENTION

Related Application

This application is a continuation-in-part application of a previously filed co-pending application dated Feb. 14, 1986 and entitled: WATER INJECTION APPARATUS FOR INTERNAL COMBUSTION ENGINES, Ser, No. 06/829,186, now abandoned.

FIELD

This invention relates to water injection apparatus for internal combustion engines. More particularly, it relates to a fluid injection system for injection of water mixtures into the manifold of an internal combustion engine in response to the intake pressures created therein.

State of the Art

Various fluid injection systems to inject water into an internal combustion engine to improve combustion are known. These water injection systems have become more popular in response to environmental concerns to reduce air emissions of unburned by-products. Peace et al., U.S. Pat. No. 4,391,230, illustrates a water injection apparatus for internal combustion engines mounted on the air fuel manifold of the engine. The Peace device utilizes a conduit system to provide a continuous flow of fluid mixture into the manifold, a second conduit connecting to the main conduit to inject a continuous flow into the carburetor, and a third conduit connecting the crankcase to the first conduit to collect and recirculate unburnt fuel mixtures for reinjection into the carburetor. This device requires adjustment of the pressures in the manifold, carburetor, and crankcase for efficient fluid injection, and is primarily directed to reduction of air emissions.

Turner, U.S. Pat. No. 4,391,229, discloses a steam injection apparatus heating a flow of fluid to produce steam via a coil associated with the exhaust system of a vehicle before injecting the same into the carburetor. This device requires extensive adjustments when ambient temperatures fluctuate, and the engine is not warm. In the field tests conducted by applicant, the Turner system left large beads of fluids in the lines when the engine is shut off. These fluids freeze, or are drawn into the engine in spurts upon re-start of the engine which causes erratic rough operations until the engine vacuum has cleared the air pockets in the lines. The Turner system vacuum is structured to directly pull water, but does not include a water regulator. Hence the fluid injection fluctuates as the water pick up varies when the level of the fluid in the holding tank goes down. After the vacuum to the engine has been shut off, the air valve regulating the fluid feed rate into the heating coils also has to be continually adjusted. The Turner device proportionates adjusts both the air and water inflows for admixture from both intake ports as the engine vacuum increases. It thus fails to provide an increasingly fluid enriched air mixture for injection into the intake manifold as the vacuum created by the engine operation increases.

Hart, U.S. Pat. No. 4,141,323, discloses another device utilizing a heater to inject a heated water vapor mixture into the carburetor for more efficient burning. Hart also suffers from the Turner starting problems as extreme ambient temperatures are encountered. Hart. U.S. Pat. No. 4,208,989 discloses another variation to produce heated air which is passed through a water filled container to produce vaporized water for injection into the carburetor. This moisture laden air has a tendency to precipitate in the lines when cold temperatures are encountered. Inamura, U.S. Pat. No. 4,125,092 discloses another device to inject a heated air water mixture at a point below the throttle and no later than the point the air fuel mixture enters the intake manifold. It requires a sophisticated timing system in response to the engine RPM, which injects an air/water mixture when the engine is accelerating. Csonka et al., U.S. Pat. No. 4,279,223, discloses an internal combustion engine fuel saving and pollution reduction system. The device utilizes a recirculating system to collect condensed water from the exhaust gas of an engine, and recirculates the same for injection into the carburetor. Means are required to control the amount of water passing into the engine. Temperature fluctuations of the ambient air materially affect the condensate characteristics of the exhaust gas, making cold starts difficult to regulate and control. Goodman, U.S. Pat. No. 4,191,134 discloses a fluid injection system and method for an internal combustion engine to inject a finely divided spray of fluid into the engine in response to both the engine speed and the exhaust gas pressure. This device requires careful regulation of the engine intake and exhaust pressures via an air injection pump system.

None of these devices provides a simple device to provide fluid injection directly into the intake manifold of an internal combustion engine in response to the vacuum created therein.

SUMMARY OF THE INVENTION

Applicant's invention comprises a fluid injection system for injecting aqueous fluids into the intake manifold or carburetor of an internal combustion engine. The system comprises: an aqueous fluid reservoir containing a supply of liquid; fluid conduit means to convey the liquid; a mixer associated with the fluid conduit means to deliver a predetermined flow of fluid, and having an air intake to convey air into a mixing chamber to mix a predetermined essentially constant flow of air over the operating range of the engine with the fluid and atomize the same; and mixture conduit means associated with the mixing chamber to transport the atomized mixture for injection into the engine intake manifold in response to the vacuum created therein. In one preferred embodiment, the mixer is a three way valve, with a first passage leading to an air intake, a second passage leading to a fluid intake, and a third outlet exit passage connecting to the mixture conduit means leading into the intake manifold. The air intake is restricted to limit an essentially constant predetermined flow of air to enter the system. This is preferably accomplished with a combination air regulator and filter to adjust the amount of air entering the valve to be mixed with the fluid. The air flow is restricted to insure the air flow does not exceed the maximum air flow required to continuously draw liquid into the three way valve. The air flow is thus set at a flow rate to prevent the breaking of the siphoning action drawing liquid into the three way valve to insure a continuous flow of liquid entering the three-way valve over the operating range of the engine for mixing with air. The three-way valve may include an adjustable needle valve to restrict the junction where the air and liquid passages come into contact. The structure of the needle valve restricted junction creates air turbulence to insure efficient mixing of the air and liquid to provide an atomized stream exiting the mixing valve outlet.

To operate the device, the engine is started creating a vacuum suction within the manifold, and the mixture conduit means. In response to the vacuum in the mixture conduit means, a fixed flow of ambient air is drawn into the three way valve via the air intake and mixed with a predetermined amount of fluid also drawn into the three way valve in response to the vacuum. The valve restricts the amount of fluid to be atomized by the jet of air into a fixed proportion fluid/air fine mist. This atomized fluid mixture is then delivered into the manifold by the mixture conduit means in response to the vacuum created therein to be mixed with intake air from the air filter.

The point of delivery into the manifold is the intake port where the positive crankcase ventilation (PCV) connects. The mixture conduit means is joined to the PCV line via a T connector to deliver the atomized mixture into the PCV line. This method and point of delivery is used for ease in hooking up the system, although any other point could be used provided it injects the atomized fluid mixture in a manner which admixes with the air/fuel mixture delivered from the carburetor into the intake manifold. Partial pre-mixing of the atomized mist with the unburned fuel and gases carried by the PCV system occurs within the PCV line. This premixing aids in providing a more uniform combustion mixture for injection into the engine.

The device is adjusted by running the engine at a fast idle, creating a vacuum pressure within the intake manifold of approximately 15 lbs./sq. inch. The restricted air intake provides approximately 50 SCFH entering the three way valve. The three way valve is then adjusted to mix approximately 13 parts of air with 1 part liquid for injection into the intake manifold. This produces a flow rate of fluid into the valve of approximately 0.1 LPM. The three way valve may include a needle adjusting screw to adjust the amount of fixed proportions of air and fluid drawn into the valve for mixing with air. Once set, the valve is left alone to inject a constant air stream to create an atomized fluid mixture for injection into the intake manifold in direct response to the vacuum of the intake manifold. Even though the intake manifold pressure increases, a constant air/fluid mixture is injected. To offset the increased vacuum in the intake manifold as the engine reaches higher rpm, additional air is drawn in from the carburetor and admixed with the atomized fluid mixture to provide a leaner air/fluid mixture for injection into the engine.

Preferably, the water and mixture conduit means are constructed of $\frac{1}{8}$ inch inside diameter polyvinyl chloride (PVC) plastic tubing, or a similar rigid material, which will not collapse when a vacuum is created therein. The air intake port may include adjustment means to vary the amount flow of air entering the three way valve. The adjustment means preferably includes a filter to prevent grit in the air drawn into the valve from entering the engine. The air flow intake into the three way mixing valve is set to mix enough air to continuously siphon water into the valve after the screw adjustment is set. Thus, the air mixture may be varied; but, once set, provides an approximately constant atomized mixture for injection into the intake manifold over the operating range of the engine, resulting in a leaner atomized mixture being injected at higher engine RPM's.

The device may be connected to the windshield washer bottle of a conventional vehicle to use the alcohol washer fluid contained therein, rather than requiring a separate fluid reservoir. If the washer bottle fluid is used, the alcohol washer fluid mixture increases the octane combustion characteristics of the fuel mixture entering the carburetor. An alcohol fluid mixture also prevents the fluid mixture from freezing when the device is used in cold climates.

A cut off valve may be included between the mixing valve and the mixture conduit means to shut off the system should it be necessary to shut off the water injection system. For example, a recreational vehicle may be outfitted with the device adjusted to inject high levels of water when the recreational vehicle engine encounters high loads. The cut off valve is thus activated to prevent water injection when normal load conditions are encountered. In one preferred embodiment, a solenoid operated cut off valve is used having a valve junction which also acts to again mix the air/fluid mixture as it flows through before injection into the intake manifold. Secondary mixing is accomplished by passing the mixture through a restricted juncture which creates turbulence, thereby remixing the atomized mixture.

A heat activated valve may be included to activate the system when the engine reaches a predetermined temperature. This heat activated valve is particularly used in colder climates, where fluids tend to build up in engines over night. Before applicant's device should be employed, it is necessary for the engine to first heat up and drive off this fluid build-up for optimal performance. In one preferred embodiment, the water conduit from the reservoir fluid means connects to a thermostat valve placed in between the mixing valve and the intake manifold. The thermostat valve is attached to the exhaust manifold. As the exhaust manifold temperature rises, the engine fluids are driven off. The thermostat valve then opens allowing atomized water to pass into the intake manifold.

The atomized air/liquid mixture provides an oxygen enriched water mixture for injection into the intake manifold; providing better engine combustion characteristics, particularly for vehicles used at high altitudes. Thus, engine performance is significantly improved when applicant's invention is utilized with an internal combustion engine. Applicant's testing results show that fuel consumption is minimized by approximately 10%, while acceleration is also increased. Not only is fuel use minimized, but air emissions are also reduced. In one test on a 1979 Chevrolet Caprice which did not have a catalytic converter system, hydrocarbon carbon emissions were reduced from 1,780 ppm to 97 ppm. CO emissions were reduced from 3.74% to 0.3%. Mileage was also improved from 14 mpg to 18.9 mpg. The atomized water mixture also cools the internal combustion chambers within the engine to minimize pre-ignition knocking. When an enriched alcohol water mixture is used, the atomized alcohol mixture added to the fuel provides a higher octane fuel mixture, providing more power. Thus, applicant's invention provides the same advantages of other fluid injection systems, but avoids the complicated valve and adjustment devices required to regulate the air inputs, temper- atures, and fluid injection rates.

The device can be readily installed on conventional vehicles, without sophisticated tools, or training. The system also does not take up significant room within the engine compartment, particularly when used in association with the windshield washer bottle of the vehicle.

DESCRIPTION OF THE ILLUSTRATED EMBODIMENTS

Figure 1:
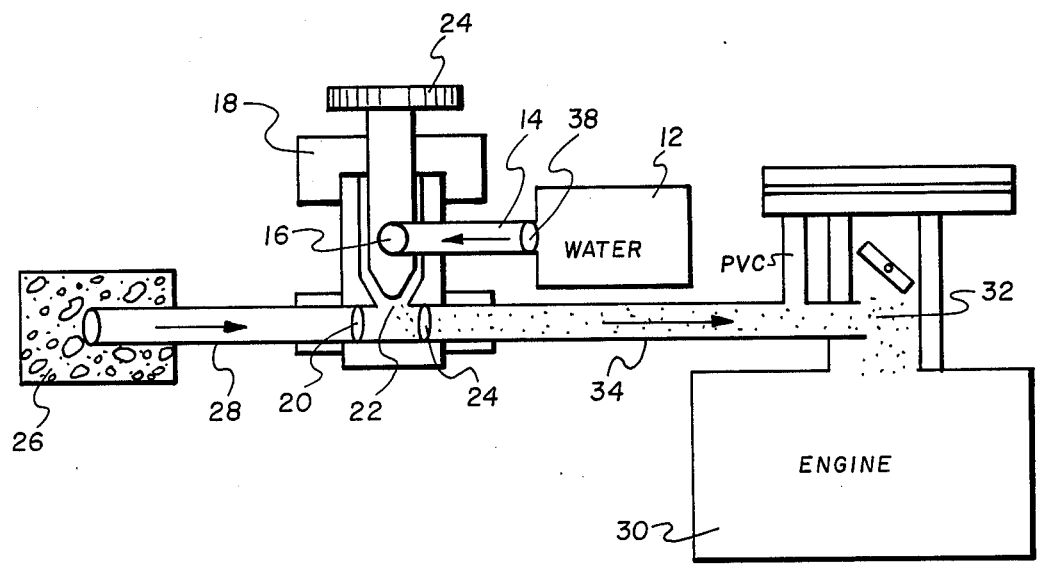
FIG. 1 is a perspective view of one embodiment of the invention.
Figure 2:
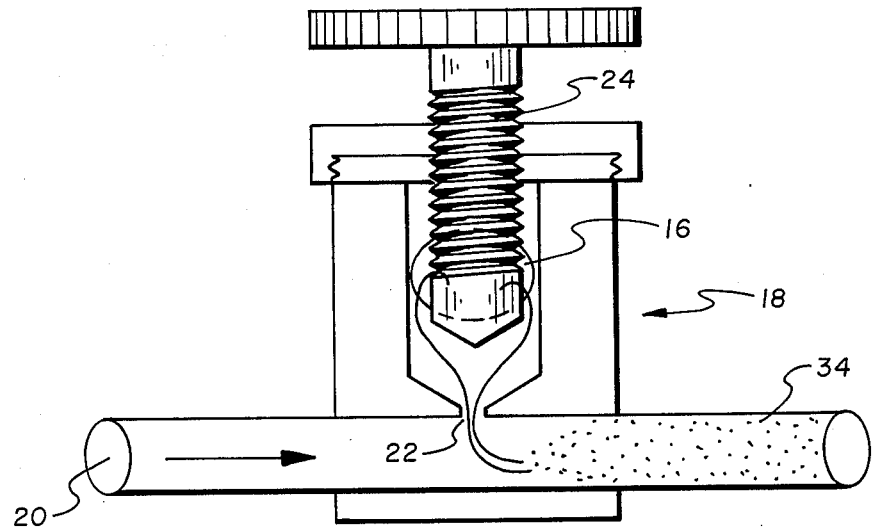
FIG. 2 is a cross-sectional view of the three-way valve.
Figure 3:
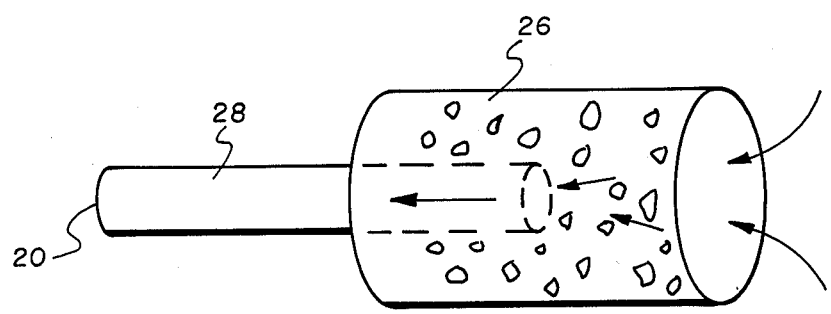
FIG. 3 is a cross-sectional view of the air intake regulator.

FIG. 1 illustrates one embodiment of applicant's invention 10. The water injection system comprises: a water bottle 12 capable of holding approximately one gallon of a water solution. Said bottle 12 mounts to the wall (not shown) of the engine compartment of a conventional vehicle. A one eighth inch inner diameter PVC tube 14 is connected to the bottle 12 to transport fluid therefrom to the fluid intake port 16 of a three way T valve 18. The three way valve 18 has an air intake port 20 leading to a junction 22 with the water intake port 16 injecting at right angles a predetermined stream of fluid into the air stream as shown in FIG. 2. The junction 22 angle of injection of the fluid stream creates air turbulence as an air steam is directed past the junction 22 to mix with the fluid. The three way valve 18 has a needle adjusting screw 24 to selectively restrict the fluid flow entering the junction 22. The air flow entering the valve 18 is restricted to insure that the air flow through the junction will not break the siphon action drawing fluid into the junction 22 to produce an atomized mixture. The valve 18 is adjusted to draw in approximately 0.1 LPM fluid to be mixed with approximately 13 parts of air to 1 part liquid. The three way valve 18 is machined to close tolerances so that fluid/air adjustments can be made very accurately. An air regulator and filter 26 shown in FIG. 3 is associated with the air intake port 20 via a connecting piece of one eighth inch inner diameter PVC hollow tubing 28 to control and restrict the amount of ambient air entering the port 20. The air regulator and filter 26 limits the amount of air entering the three way valve 18 to approximately 50 SCFH, which insures that the siphoning action drawing fluids into the valve 18 is not broken. The filter prevents dirt and air impurities from entering the valve 18. The air/fuel mixture is drawn into the intake manifold 32 by the vacuum suction created by the engine 30 through the mixture conduit means 34 shown as PVC tubing connected with a T coupling to the PCV line to inject the mixture into the intake manifold 32.

The fluid mixture in the water bottle 12 is preferably comprised of a mixture of ethanol, or similar alcohol additive, and water. The ethanol additive is added mainly in the winter months and comprises approximately 25% alcohol and 75% water. The percentage of alcohol additive added declines as the engine octane requirements decline, or the ambient operating temperatures rise.

Figure 4:
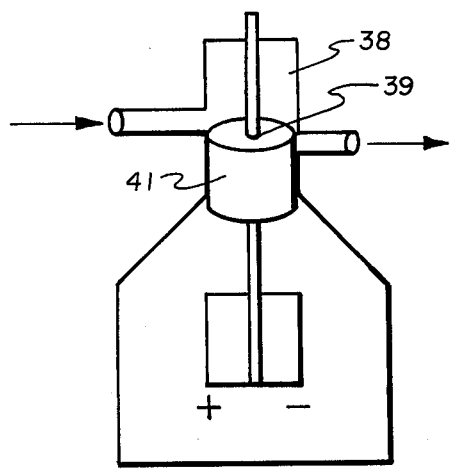
FIG. 4 is a cross-sectional view of the solenoid valve.

To prevent back siphoning of fluid into the intake water bottle 12 after the engine 30 has been turned off, a check valve (not shown) may be included. The check valve is mounted in association with the opening 38 of the PVC tube 14 entering the water bottle 12 to hold a fluid column in the tube 14 to immediately deliver a fluid steam to the three way valve 18 when the engine is started. The check valve thus insures that an atomized fluid mixture is injected immediately without having to wait for a vacuum build up within the tube 14 to draw fluids from the water bottle 12. A solenoid shut-off valve 39 shown in FIG. 4 may be included to shut the system off, when desired. The shut-off valve 39 is associated with the mixture conduit 34 between the three way valve 18, and the intake manifold 32. Thus the system 10 may be isolated by a user operating the shut-off valve 39 when making repairs or adjustments to the system. The system 10 can also be selectively operated and turned on only when additional power is required by injecting atomized water into the engine at these times. This particular valve 39 acts as a secondary mixing chamber, as well as a shut-off, to again atomize the air/water mixture to provide a fine mist for injection into the intake manifold 32. The valve 39 has an off-set entry passage 39A leading into the solenoid cylinder chamber accommodating the solenoid activated cylinder 41 shown in the closed position to shut off the exit port 39B leading to the exhaust manifold 32. The jogged passage creates air turbulence as a jet of air is directed through the valve 39. This air turbulence again mixes the atomized mixture to insure that a fine mist is delivered to the intake manifold 32.

The system 10 is adjusted by setting the needle valve 24 to add on the average one part of water/alcohol to 15 to 17 parts of fuel in response to the vacuum created by the engine 30. Preferably distilled or demineralized water is used to prevent scaling buildup within the engine 30. A fluid filter (not shown) may also be included to filter the fluid before it enters the fluid conduit 14.

Figure 5:
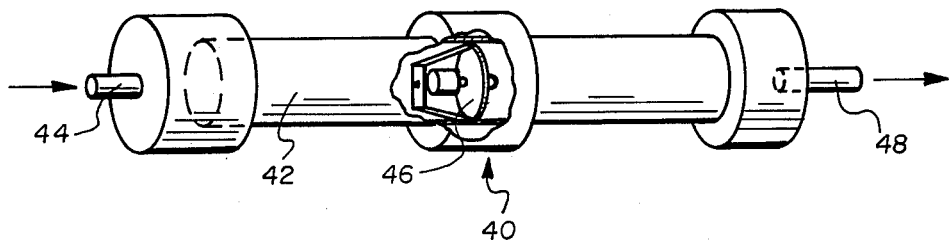
FIG. 5 is a cross-sectional view of the thermostat valve.

A heat activated switch 40 shown in FIG. 5 may be included after the three way valve 18 to inject atomized fluids into the intake manifold when the engine reaches a predetermined temperature. The switch 40 comprises a 2 inch diameter metal casing 42 attached to the exhaust manifold (not shown) and heated thereby. A ⅛ inch inside diameter tube 44 leads into the casing 42 to convey fluids inside the casing 42 from the water bottle 12. An automotive radiator thermostat 46 is sealed inside of the casing 42. A ⅛ inch inside diameter exit conduit 48 is in communication with the inside of the casing on the other side of the thermostat 46 to convey fluids to the intake manifold 32. As the switch 40 is heated by the intake manifold it opens the thermostat 46 a predetermined temperature (preferably approximately 190° F.) is achieved. The atomized fluid then passes through the switch 40 and is conveyed to the intake manifold 32 via the the exit conduit 48 to cool the engine for more optimal performance.

Although this specification has made reference to the illustrated embodiments, it is not intended to restrict the scope of the appended claims. The claims themselves recite those features deemed essential to the invention.

I claim:

1. A fluid injection system for injecting a mist of fluids, essentially comprised of water, water soluble alcohol mixtures, and the like, into the intake manifold of an internal combustion engine for mixing with the hydrocarbon fuels powering the engine for more complete combustion comprising:

a. a fluid reservoir to hold a supply of fluid,
   b. fluid conduit means to transport the fluid, c. a mixer component having:
  i. a mixing junction structured to receive and turbulently mix incoming fluid and air streams;
  ii. a flow adjustable fluid intake port in communication with the mixing junction, and associated with the fluid conduit means; said intake port flow pre-set by the user to deliver the required fluid to provide the desired engine combustion requirements
  iii. a restricted fixed air flow intake port in communication with the mixing junction, and associated with an ambient air source to deliver a predetermined approximately constant air flow into the mixing junction pre-set to prevent the breaking of the siphoning action drawing fluid into the mixing junction for atomization to provide an atomized constant air with varying amounts of fluid mixture; and
d. mixture conduit means associated with the mixing junction to collect and transport the atomized fluid mixture for delivery into the intake manifold for admixture with the air drawn into the air intake of the engine in response to the vacuum created therein for blending with the fuel.

2. A fluid injection system according to claim 1, wherein the fluid reservoir is structured as a window washer bottle.

3. A fluid injection system according to claim 1, wherein the fluid comprises a mixture of water and alcohol.

4. A fluid injection system according to claim 1, wherein the mixer comprises a three way valve having three ports in communication with each other at a junction structured to created air turbulence when an air stream enters the junction; said first port having a fixed cross sectional area in communication with an ambient air source to intake and deliver a predetermined constant flow of air to the junction; said second port having a variable cross-sectional area in communication with the fluid reservoir to draw in and deliver a predetermined flow of liquid to the junction to be atomized by the intake air stream entering the junction, and said third port structured to collect and deliver the atomized mixture formed at the junction to the mixture conduit for delivery into the engine intake manifold.

5. A fluid injection system according to claim 4, including adjustment means associated with the junction to simultaneously adjust both the air and fluid flows entering the junction to maintain the air fluid proportions and increase the quantity of the atomized mixture delivered to the intake manifold.

6. A fluid injection system according to claim 4, including an air regulator filter associated with the first port to filter and restrict the amount of ambient air entering said first port.

7. A fluid injection system according to claim 6, wherein the first port includes adjustment means to adjust the composition of the atomized mixture by adjusting the amount of predetermined flow of air entering the valve.

8. A fluid injection system according to claim 1, wherein the second port includes adjustment means to adjust the composition of the atomized mixture by adjusting the amount of predetermined flow of fluid entering the system.

9. A fluid injection system according to claim 1, including a thremostatic valve mounted in association with the mixture conduit means between the mixer and the intake manifold having a first mode wherein the atomized mixture can pass into through the conduit means into the intake manifold, and a second mode wherein the atomized mixture is prevented from passing through the conduit means and entering the intake manifold.

10. A fluid injection system according to claim 1, wherein the mixture and fluid conduit means comprise rigid hollow tubing.

11. A fluid injection system according to claim 1, including a thermally activated switch with a heat sensor mounted in association engine, and located between the mixer and the fluid reservoir, having a first mode wherein the fluid is prevented from passing into the mixer when the engine is below a predetermined temperature, and a second mode wherein the fluid is allowed to pass into the mixer when the engine reaches a predetermined temperature.

* * * * *